Figure 1:
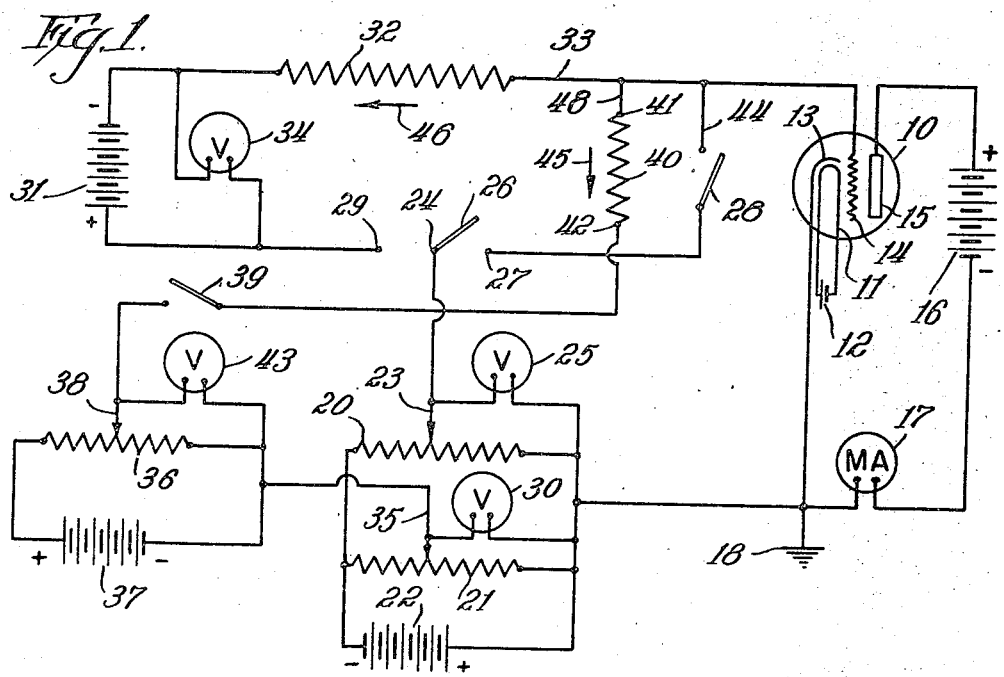

Feb. 15, 1949.   J. RAZEK   2,461,923
APPARATUS FOR MEASURING HIGH RESISTANCE
Filed Sept. 13, 1944

INVENTOR.
Joseph Razek
BY
Jesch and Darbo
attys.

Patented Feb. 15, 1949

2,461,923

UNITED STATES PATENT OFFICE 2,461,923

APPARATUS FOR MEASURING HIGH RESISTANCE

Joseph Razek, Llanerch, Pa., assignor, by mesne assignments, to Oliver W. Storey, Wheaton, Ill., as trustee, for the partnership of O. W. Storey & Associates, Chicago, Ill.

Application September 13, 1944, Serial No. 553,943

6 Claims. (Cl. 175—183)

This invention relates to an apparatus and method for measuring electrical resistances of high value, i. e., of the order of magnitude of from one hundred to one million megohms. The measurement of resistances of such high value presents considerable difficulty, primarily because of the difficulties involved in obtaining and handling voltages of sufficient magnitude to cause a measurable current to flow through a resistance of such high value.

It is the object of the invention to provide an apparatus employing a vacuum tube which is quite simple and still enables one to measure resistances of such high order with an entirely satisfactory degree of accuracy.

Figure 2:
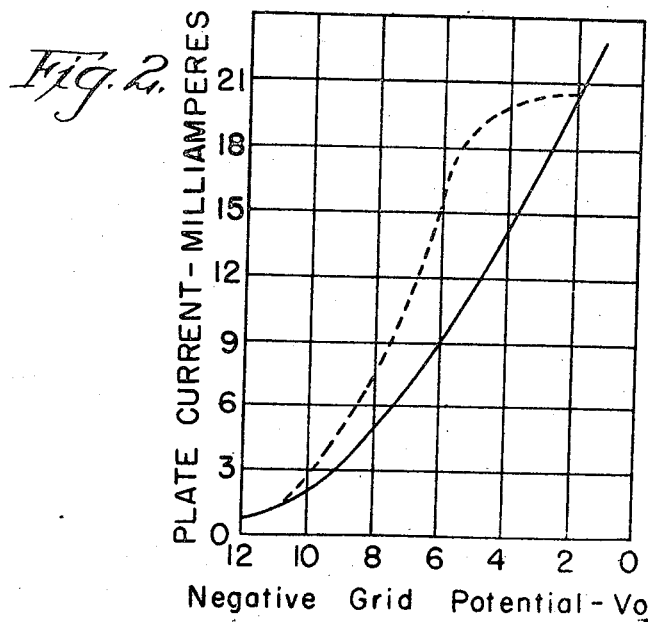

In the drawing:

Fig. 1 is a diagrammatic representation of the apparatus of the present invention; and Fig. 2 is a graph of curves showing the typical relationships which exist between the current in the plate circuit and the potential impressed upon the grid circuit of the vacuum tube which is employed in the apparatus.

In the apparatus of Fig. 1, the tube 10 is a high vacuum triode of the indirectly heated cathode type. Such a tube has been found to be satisfactory for the purpose of the invention. An ordinary type 89 triode connected tube is an example of one which is suitable for the purpose. Other types of triodes may be used, however, the characteristics essential for satisfactory operation being that the tube be well degassed and that the resistance from the grid through the parts of the tube to ground be high. The tube comprises the filament 11 which is energized by the battery 12, the cathode 13, the grid 14 and the plate 15.

A positive potential with respect to the cathode is impressed upon the plate by means of a battery 16 which is connected in series with milliammeter 17 in the plate circuit, i. e., between the cathode and the plate. The cathode 13 is connected to the ground 18. The conductors connecting the members of the apparatus are constructed and arranged so as to possess negligible resistance and, except for a few which should be well insulated from the ground, will not themselves be mentioned in this description.

Connected also to the cathode 13 are two potentiometers 20 and 21, connected in parallel relation to each other and both energized by means of the battery 22, the polarity of which is such that the positive terminals of the potentiometers are disposed toward the cathode 13.

The potentiometer 20 has a movable contact 23 which is connected to the central terminal 24 of the single pole double throw switch 26. The end terminal 27 of switch 26 is connected through a single pole, single throw switch 28 to the grid 14 of the tube 10. The switch 28 is provided in order to introduce the high insulation necessary for satisfactory operation. If it were not used, switch 26 would have to be especially designed to provide high insulation between the poles thereof.

To the opposite end terminal 29 of switch 26 is connected, in series relationship, the battery 31, the member 32 and the grid 14. The member 32 is connected to the grid 14 by means of conductor 33. The member 32 possesses resistance of a high unknown value, and it is this resistance, which will be called $R_x$, which it is desired to determine. The member 32, is therefore, represented as a resistor. In this circuit the negative terminal of battery 31 is disposed toward grid 14 and a voltmeter 34 is connected across the terminals of the battery 31.

The movable contact 35 of the potentiometer 21 is connected in series with a second potentiometer 36 which is energized by the battery 37. Voltmeters 25 and 30 may be connected between the movable contacts 23 and 35 and the positive terminals of potentiometers 20 and 21 respectively if desired, although such voltmeters are not necessary to the operation of the apparatus. The polarity of the battery 37 is such that the negative terminal of potentiometer 36 is disposed toward the cathode 13, i. e., the polarity of potentiometer 36 is reversed with respect to that of potentiometer 21.

The movable contact 38 of the potentiometer 36 is connected in series relationship through a switch 39 and a resistor 40 to grid 14. A voltmeter 43 is connected between the movable contact 38 and the negative terminal of the potentiometer 36 whereby it is adapted to indicate the potential difference contributed to the circuit by potentiometer 36. The value of the resistance possessed by resistor 40 is known, and will be called $R_n$. Resistor 40 has terminal 41 connected to the grid 14 and a second terminal 42 at the opposite end thereof. The connection between terminal 41 and grid 14 is by means of conductor 33 and branch conductor 48 leading from conductor 33 to terminal 41. The connection between switch 28 and grid 14 is by means of conductor 33 and branch conductor 44 leading from conductor 33 to switch 28.

As an example of the values which may be employed for the various elements of the apparatus adapted to measure unknown resistances of from one hundred to one million megohms, the resistance of resistor 40 should not be as great as, and in most cases, will be less than one one-hundredth of that of the unknown resistance. Values of from 100 to 10,000 megohms may be used. Resistors having resistances of such values are commercially available and retain their resistance at a substantially constant value over long periods of time. The resistance values of potentiometers 20, 21 and 36 may be from 10,000 to 25,000 ohms, the potential of battery 31 from 20 to 150 volts, that of each of batteries 22 and 37 may be 22 volts, and that of the plate battery 16 from 45 to 90 volts.

It has been mentioned heretofore that the resistance between some of the conductors and the ground should be high. This is true of the conductors extending between grid 14 on the one hand and switch 28, resistor 40 and resistor 32 on the other, that is, conductors 33, 48 and 44. This resistance should be at least as great as the resistance value of resistor 40. If it is less than this, sufficient leakage of current may take place from the grid 14 to impair the accuracy of the results.

In connection with the operation of the apparatus of Fig. 1 to determine the value of the resistance of resistor 32, the curves shown in Fig. 2 represent the typical characteristics of a vacuum tube of the triode type represented by tube 10. The specific values shown are by way of example only and it is to be understood that they will vary with different tubes and different values of resistance in resistor 40. The full line curve of Fig. 2 represents the values of plate current for different values of negative potential applied directly to the grid. When switch 39 is opened and switch 28 is closed and double throw switch 26 is manipulated to connect terminals 24 and 27 and disconnect terminals 24 and 29, the potential difference between the terminals of potentiometer 20 is impressed directly upon the grid 14 of tube 10, i. e., when a potential difference of 6 volts exists between the terminals of potentiometer 20, a negative potential of substantially equal value, i. e., 6 volts, is impressed upon grid 14 and a current of 9 milliamperes flows in the plate circuit of tube 10.

In the dotted line curve of Fig. 2 the ordinates represent the plate current which will flow when the negative potential, with respect to the cathode 13, represented by the abscissae is impressed upon terminal 42 of the resistor 40. When the switch 26 is manipulated to disconnect terminal 24 from both terminals 27 and 29 the potentiometer 20 is disconnected from the grid. Now, when switch 39 is closed, and the movable contact 38 of potentiometer 36 is moved all of the way to the negative end thereof whereby the potentiometer 36 does not contribute any potential to the circuit, the negative potential contributed by potentiometer 21 is impressed upon the grid 14 through the resistor 40. In order to obtain a current of 9 milliamperes in the plate circuit of tube 10, it is necessary to move the contact 35 of potentiometer 21 to a point such that a negative potential, with respect to the cathode 13, of approximately 7.5 volts is impressed upon the terminal 42 of resistor 40. Since the negative potential actually applied to the grid is the same as it was before, namely, 6 volts, the difference, or 1.5 volts, represents the potential drop across the terminals of the resistor 40. This potential drop is due to the flow of current in the grid circuit of tube 10. This current represents the resultant of a variety of factors that permit the flow of current from the cathode to the grid of the tube although the grid is at a negative potential with respect to the cathode, such factors are; electrical leakage between the internal parts of the tube, the deposition of positive ions upon the grid by the residual gas in the tube, etc. Such current is called positive ion grid current to distinguish it from the normal grid current which flows when the grid is at a positive potential with respect to the cathode. By using an extremely sensitive galvanometer in the grid circuit, it is possible to measure such grid current directly and for a well degassed and well insulated tube, it has been found that this positive ion grid current is equal to approximately $10^{-6}$ to $10^{-7}$ times the plate current and bears a fixed, approximately linear relation to the plate current, as has been explained in the articles by Mulder and Razek, entitled "High Grid Resistor Amplifier," Journal of the Optical Society of American and Review of Scientific Instruments, vol. 18, No. 6, June, 1929, pp. 466–472, and "A Bridge Grid Resistor Amplifier," J. O. S. A. and R. S. I., vol. 19, No. 6, December, 1929, pp. 390–403. With a vacuum tube of the 89 type, a resistance value of approximately 1000 megohms for the resistor 40 will give relationships of an order approaching those represented by the dotted line curve of Fig. 2.

In the operation of the apparatus, the arm of the double throw switch 26 is first moved to connect terminals 24 and 27 and disconnect terminals 24 and 29 and switch 39 is opened and switch 28 is closed. The negative terminal 23 of potentiometer 20, is thereby connected directly to the grid 14 of tube 10. The contact 23 is moved to a position such that the desired value of current, for example 9 milliamperes, flows in the plate circuit of the tube. As will become apparent from the description which follows, the current in the plate circuit is employed simply as a measure of the negative potential applied to the grid 14. It is a characteristic of the tube that the relationship between the plate current and the grid potential is fixed and that the value of the plate current is a definite measure of the grid potential. A potential difference $V_0$ will be found to exist between the terminals of potentiometer 20.

The switch 28 is then opened and the arm of switch 26 is moved so as to disconnect terminal 24 from both terminals 27 and 29, and the switch 39 is closed. Simultaneously, the movable contact 38 of potentiometer 36 is moved to the negative end thereof whereby no potential difference is contributed to the circuit by the potentiometer 36 and the voltmeter 43 registers zero. The movable contact 35 of potentiometer 21 is then adjusted until the same current as before, namely 9 milliamperes, flows in the plate circuit of tube 10. In other words, the negative potential of grid 14 is adjusted to be the same as it was previously when it was connected directly to the negative terminal 23 of the potentiometer 20. A potential difference $V_1$ will be found to exist between the terminals of potentiometer 21 which is greater than the potential difference $V_0$ found earlier between the terminals of potentiometer 20. The difference between $V_1$ and $V_0$ is the potential drop between the terminals 41 and 42 of resistor 40. As pointed out heretofore, the latter potential drop is due to a flow of current $i_h$ in the grid circuit. Employing the conventional method of designating the direction of current flow, this Current flows in the direction indicated by the arrow 45, and has a value determined by the following equation:

$$i_h = \frac{V_1 - V_0}{R_h} \tag{1}$$

whence $$i_h R_h = V_1 - V_0 \tag{2}$$

where $R_h$, as mentioned heretofore, represents the known value of resistance of resistor 40. The proper units of value are to be employed in this equation in accordance with Ohm's law.

Without disturbing the positions of movable contacts 23 and 35, the arm of double throw switch 26 is now moved to disconnect terminals 24 and 27 and connect terminals 24 and 29, placing in the grid circuit, in series with potentiometer 20, the battery 31 and the resistor 32, the resistance of which is unknown. Leaving the switch 39 in the closed position, the movable contact of potentiometer 36 is then adjusted until the same current value, i. e., 9 milliamperes, flows in the plate circuit. The last adjustment of potentiometer 36 assures that the negative potential of the grid 14 is again at the same value as it was at the two previous operations, i. e., 6 volts.

It is to be noted that with the switches 26 and 39 in the positions last specified, there are two grid circuits in parallel relationship with each other. The first of these circuits consists of the serially connected potentiometer 20, battery 31 and resistor 32. The second consists of the serially connected potentiometers 21 and 36, and the resistor 40. The value of the potential difference supplied by battery 31 should be sufficient that when the first grid circuit is closed and the second is opened, which is accomplished by opening switch 39 and allowing terminal 24 of switch 26 to remain connected to terminal 29 and disconnected from terminal 27, the potential of the grid is more negative than the negative value which was used at the outset as a standard, i. e., 6.0 volts.

With both of the grid circuits closed as described heretofore, the movable contact 38 of the potentiometer 36 is moved toward the positive terminal of said potentiometer until the current flowing in the plate circuit is again 9 milliamperes, and the negative potential applied to grid 14 is again at the said predetermined standard. By the said adjustment of the movable contact 38 a potential is contributed by potentiometer 36 to the second grid circuit which has the effect of reducing the negative potential upon grid 14.

Analyzing the circuit arrangement described, first, it is evident that as long as the movable contacts 23, 35 and 38 of potentiometers 21, 22 and 37 are not disturbed, the potential differences between the terminals of the different potentiometers remain fixed for all practical purposes regardless of any changes which are made in the grid circuits to which they are connected, or even whether such grid circuits are open or closed. This is because the currents produced in the potentiometers by the batteries 22 and 37 have values of the order of milliamperes while the positive grid current has a value of a few hundredths of a microampere. The effect of the grid current, therefore, is so slight as to be quite negligible. Second, under the adjustment described, it is evident that the current flowing between the grid 14 and the cathode 13 of the tube 10 has the same value $i_h$ as it had at the previous times when the potential of the grid was adjusted to be negative 6 volts. This is because of the fixed relationship which exists between the positive ion grid current and the plate current mentioned heretofore.

Giving the value $i_x$ to the current flowing through the resistor 32, the direction of which is indicated by the arrow 46, it is evident that the current flowing through the resistor 40 has a value equal to $i_h$ minus $i_x$, since, the resistors 32 and 40 being connected in parallel relationship with each other, the sum of the currents flowing through them equals the current $i_h$ flowing between the grid 14 and the cathode 13. Giving the value of E to the potential difference contributed by the battery 31 and the value of $e$ to the potential difference contributed by the potentiometer 36, the following relationships are true of the system described. Starting with the cathode 13 and proceeding through the tube 10 to the grid 14 and thence through each of the grid circuits and back to the cathode, the following equations represent the relationships:

For the first grid circuit containing the resistor 32, $$-V_0 - i_x R_x + E + V_0 = 0 \tag{3}$$

whence $$E = i_x R_x \tag{4}$$

For the second grid circuit containing the resistor 40, $$-V_0 - i_h R_h + i_x R_h - e + V_1 = 0 \tag{5}$$

Substituting the value of $i_h R_h$ found in Equation 2 into Equation 5, $$-V_0 + V_0 - V_1 + i_x R_h - e + V_1 = 0 \tag{6}$$

whence $$e = i_x R_h \tag{7}$$

Dividing Equation 4 by Equation 7, $$\frac{E}{e} = \frac{i_x R_x}{i_x R_h} \tag{8}$$

whence $$R_x = R_h \frac{E}{e} \tag{9}$$

Therefore, the value of the unknown resistance, $R_x$, is obtained by multiplying the value of the known resistance, $R_h$, by the ratio of the two potential differences, E and $e$.

The apparatus of the present invention is also adapted for measuring high resistance values where the resistor is itself a source of potential. For example, it is adapted to measure the resistance of a hydrogen calomel cell, such as is used in making conductivity and pH measurements. In making the resistance measurement, the cell is arranged in the circuit in the position occupied by the unknown resistor 32 and in series aiding relationship with battery 31, i. e., with the negative terminal of the cell disposed toward the grid 14. The same procedure as described heretofore is then followed. Representing the resistance of the cell by $R_x$ and the potential developed by the cell as $E_1$ and that contributed by potentiometer 36 as $e_1$, and substituting the proper values in Equation 9 the following relationship is obtained:

$$\frac{R_x}{R_h} = \frac{E + E_1}{e_1} \tag{10}$$

The hydrogen calomel cell is now disconnected from the circuit and re-connected in the same position as before but with its terminals reversed, that is, with its positive terminal disposed toward the grid 14. Substituting proper values in Equation 6, provides the following relationship:

$$\frac{R_x}{R_h} = \frac{E - E_1}{e_2} \quad (11)$$

Assuming that the resistance of the cell is the same in both of the foregoing positions in the grid circuit, which is substantially true, the right hand members of Equations 10 and 11 are equal to each other, that is, $$\frac{E + E_1}{e_1} = \frac{E - E_1}{e_2} \quad (12)$$

which reduces to $$E_1 = E \frac{(e_1 - e_2)}{(e_1 + e_2)} \quad (13)$$

In other words, the potential difference developed by the cell is equal to the potential difference contributed by the battery 31 multiplied by the ratio of the difference between the potentials contributed by the potentiometer 36 with the cell connected in the two different manners described heretofore to the sum of the same potentials.

To determine the resistance of the cell, the value of $E_1$ obtained in Equation 13 is substituted in Equation 10 with the following result:

$$\frac{R_x}{R_h} = \frac{E}{\frac{1}{2}(e_1 + e_2)} \quad (14)$$

which reduces to:

$$R_x = \frac{ER_h}{\frac{1}{2}(e_1 + e_2)} \quad (15)$$

All of the values on the right hand side of Equation 15 are known or may be read upon the various meters so that the resistance of the hydrogen calomel cell may be determined directly from the known values.

In the operation of the apparatus, factors which tend to reduce the resistance from the grid to the ground should be avoided. One of these is moisture which may deposit upon the apparatus under conditions of high humidity. The apparatus should preferably be operated in a relatively dry atmosphere. It is usually desirable to operate the apparatus with a relatively high voltage, for example, 90 volts, impressed upon the plate circuit. However, an individual tube may be encountered in which the quantity of residual gas is so great that with such high voltage, excessive current will flow in the grid circuit beyond that which lends itself to convenient operation. In such case, a lower voltage may be used in the plate circuit such that the grid circuit current will be reduced to a value which is entirely satisfactory. In such a tube the relationship between plate current and grid potential is not as constant as in a more thoroughly degassed tube and the sensitivity of the apparatus is somewhat less as a consequence. However, for most purposes, the sensitivity is sufficient to give results which are quite satisfactory.

The invention provides a simple and economical means for accurately determining resistances of very high value. All of the parts of the apparatus are readily available and inexpensive. One of the important advantages is that the apparatus may employ an ordinary triode vacuum tube in which positive ion grid current is present and does not require the especially designed and expensive tubes in which such current is absent.

I claim:

1. Means for measuring the value of an unknown resistance comprising, in combination, a vacuum tube having a cathode, a plate, and a grid, a plate circuit for said tube including means for indicating the value of current therein, a plurality of grid circuits for said tube in parallel relationship to each other and being independently connectable into operative relationship, the first of said grid circuits comprising adjustable means for biasing said grid negatively a predetermined amount with respect to said cathode, means for inserting in said first grid circuit in series with said first grid biasing means a source of additional negative grid bias of known value and said resistance of unknown value, the second of said grid circuits comprising two adjustable grid biasing members and a resistance of known value connected in series, the polarity of said two grid biasing members being reversed with respect to each other, and means for measuring the voltage across the one of said grid biasing members having a polarity such as to increase the positive potential of said grid.

2. Means for measuring the value of an unknown resistance comprising, in combination, a vacuum tube having a cathode, a plate and a grid, a plate circuit for said tube including means for indicating the value of current therein, a plurality of grid circuits for said tube in parallel relationship to each other, the first of said grid circuits comprising means for biasing said grid negatively a predetermined amount with respect to said cathode, means for inserting in said first grid circuit in series with said first grid biasing means a source of additional negative grid bias of known value and said resistance of unknown value, the second of said grid circuits comprising two grid biasing members and a resistance of known value connected in series, the polarity of said two grid biasing members being reversed with respect to each other, the first of said grid biasing members being adapted to bias said grid negatively said predetermined amount through said known resistance, the second of said grid biasing members being adjustable and having a polarity such as to increase the positive potential of said grid, and means for measuring the potential difference across said last mentioned grid biasing member.

3. Means for measuring the value of an unknown resistance comprising, in combination, a vacuum tube having a cathode, a plate and a grid, a plate circuit for said tube including means for indicating the value of current therein, a plurality of grid circuits for said tube in parallel relationship to each other, the first of said grid circuits comprising means for biasing said grid negatively with respect to said cathode, means for inserting in said first grid circuit in series with said first grid biasing means a source of additional negative grid bias of known value and said resistance of unknown value, the second of said grid circuits comprising two grid biasing members and a resistance of known value connected in series, the polarity of said two grid biasing members being reversed with respect to each other, one of said grid biasing members being adjustable and having a polarity such to increase the positive potential of said grid, and means for measuring the potential difference across said last mentioned grid biasing member.

4. Means for measuring the value of an unknown resistance comprising, in combination, a vacuum tube having a cathode, a plate and a grid, a plate circuit for said tube including means for indicating the value of current therein, a plurality of grid circuits for said tube in parallel relationship to each other, the first of said grid circuits comprising means for biasing said grid negatively a predetermined amount with respect to said cathode, means for connecting in said first grid circuit in series with said first grid biasing means a source of additional negative grid bias of known value and said resistance of unknown value, the second of said grid circuits comprising, in series connection, a resistance of known value, means for negatively biasing said grid said predetermined amount through said resistance of known value and adjustable means for positively biasing said grid with respect to said cathode, and means for measuring the potential difference across said positive grid biasing means.

5. Apparatus for measuring the value of an unknown resistance, comprising, in combination, a vacuum tube having a cathode, a plate and a grid, a plate circuit for said tube including means for indicating the value of current therein, two grid circuits for said tube connected in parallel relationship with each other, one of said grid circuits comprising, in series connection, said unknown resistance and a source of negative grid potential exceeding by a known amount a predetermined negative potential, the second of said grid circuits comprising, in series connection, a resistance member having a known resistance, a source of negative grid potential of a value adapted to impress said predetermined negative potential upon said grid through said known resistance and an adjustable source of positive grid potential, and means for measuring the voltage across said source of positive grid potential.

6. Apparatus as claimed in claim 5, in which the resistance value of the known resistance is less than that of the unknown resistance.

JOSEPH RAZEK.

REFERENCES CITED

The following references are of record in the file of this patent:

UNITED STATES PATENTS

| Number | Name | Date |
| --- | --- | --- |
| 2,033,465 | Graham | Mar. 10, 1936 |
| 2,099,298 | Fracker | Nov. 16, 1937 |
| 2,108,294 | Doyle et al. | Feb. 15, 1938 |
| 2,340,641 | Cameron | Feb. 1, 1944 |

FOREIGN PATENTS

| Number | Country | Date |
| --- | --- | --- |
| 422,013 | Great Britain | Jan. 3, 1935 |
| 436,923 | Great Britain | Oct. 21, 1935 |